United States Patent
Bhamidipati

(10) Patent No.: US 7,514,017 B2
(45) Date of Patent: Apr. 7, 2009

(54) METHODS AND COMPOSITIONS FOR INHIBITING SURFACE ICING

(75) Inventor: Murty V. Bhamidipati, Randolph, MA (US)

(73) Assignee: E Paint Company, Cape Cod, MA (US)

(*) Notice: Subject to any disclaimer, the term of this patent is extended or adjusted under 35 U.S.C. 154(b) by 0 days.

(21) Appl. No.: 11/800,558

(22) Filed: May 7, 2007

(65) Prior Publication Data

US 2008/0276837 A1    Nov. 13, 2008

(51) Int. Cl.
   *C09K 3/18*  (2006.01)
   *C09K 5/02*  (2006.01)

(52) U.S. Cl. .............. 252/70; 106/13; 106/287.13; 106/287.14; 165/104.17

(58) Field of Classification Search ............ 252/70; 106/13, 287.13, 287.14; 165/104.17
   See application file for complete search history.

(56) References Cited

U.S. PATENT DOCUMENTS

| | | | | |
|---|---|---|---|---|
| 5,804,297 A | * | 9/1998 | Colvin et al. | 428/327 |
| 6,939,610 B1 | * | 9/2005 | Kaul | 428/403 |
| 6,953,129 B2 | * | 10/2005 | DeLay | 220/589 |
| 2002/0000306 A1 | * | 1/2002 | Bradley | 165/10 |

OTHER PUBLICATIONS

Chemical Abstract No. 138:58022, Zhang et al "Alkyl methyl silicone phase change materials for thermal interface applications", ITherm 2002, Intersociety Conference on Thermal and Thermomechanical Phenomena in Electronic Systems, 8th, San Diego, CA, May 30-Jun. 1, 2002, 485-488.*

* cited by examiner

*Primary Examiner*—Anthony J Green

(57) ABSTRACT

Surface coatings, and method of forming the coatings, are provided. The coatings inhibit the adhesion of or accumulation of ice to or on substrates to which the coatings are applied. The surface coatings preferably include a silicone phase change material.

10 Claims, 1 Drawing Sheet

METHODS AND COMPOSITIONS FOR INHIBITING SURFACE ICING

GOVERNMENT ASSISTANCE

This invention was made with United States Government support under Contract number N00167-05-C-0026 awarded by the United States Navy. The United States Government has certain rights in the invention.

TECHNICAL FIELD OF THE INVENTION

This invention relates generally to coatings, and more particularly to methods and compositions for inhibiting the adhesion of or accumulation of ice to or on surfaces.

BACKGROUND OF THE INVENTION

Ice accumulation on surfaces creates significant problems. For example, and without limitation, ice accumulation creates safety issues with aircraft, ships, and runways, and increases costs and travel delays.

Ice accumulation is addressed by mechanically or chemically removing ice from surfaces. For example, mechanical methods physically remove ice by scraping, blunt force impacting, hot-air impingement, or pneumatics. These methods are costly as they have significant time, labor, or power requirements. As for chemical removal, in addition to the cost of acquiring and applying the chemicals, the chemicals may be environmentally unsound.

These costs may be reduced, and in some instances eliminated altogether, by inhibiting the adhesion of or accumulation of ice to or on surfaces.

SUMMARY OF THE INVENTION

In accordance with the teachings of the present invention, methods and compositions for inhibiting the adhesion of or accumulation of ice to or on surfaces are provided.

In particular, coatings are provided that include one or more phase change materials. In a specific embodiment, the one or more phase change materials are formulated into a hydrophobic resin. In another specific embodiment, the phase change material is a silicone phase change material. Methods for forming the coatings are also provided.

An important technical advantage of the present invention is the provision of a phase change material in a coating to effectively inhibit the adhesion of or accumulation of ice to or on surfaces.

DETAILED DESCRIPTION OF THE INVENTION

Figures 1A, 1B, 1C, 1D:
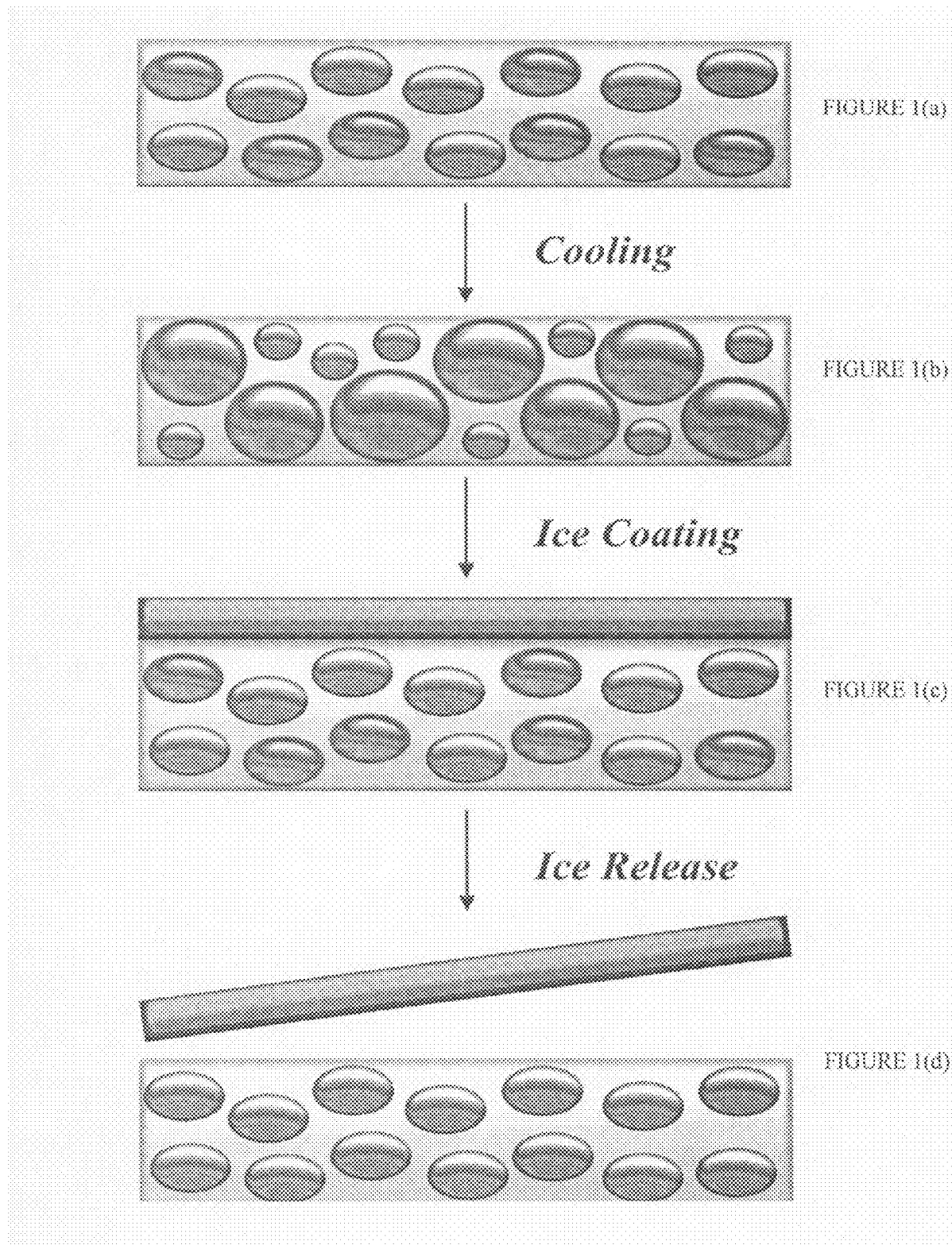
FIGS. 1(*a*), 1(*b*), 1(*c*), and 1(*d*) provide a schematic representation of an anti-icing mechanism of a coating according to the teachings of the present invention.

Disclosed herein are surface coatings, and methods of forming them, that effectively inhibit the ability of ice to adhere to or form on surfaces. These anti-icing characteristics arise from one or more phase change materials included in the coatings. In preferred embodiments, the one or more phase change materials are formulated into a coating base, which preferably comprises a hydrophobic resin. Coatings according to the present invention are particularly effective when applied to coated or uncoated metals, including, without limitation, aerospace alloys of aluminum, steel, or titanium, or to resin composites having glass, ceramic or carbon fiber reinforcements. However, the effectiveness of the coatings is not limited to metals or resin composites, as the coatings also form an effective ice inhibitor when applied to a wide variety of substrate materials.

In a preferred embodiment, the coating includes a phase change material having the following general structure:

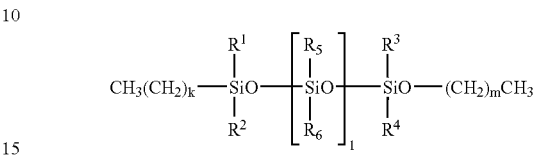

wherein $R_1$ and $R_2$ are each (independently) selected from the group consisting of $C_1$ to $C_6$ alkyloxy and aryloxy; $R_3$ and $R_4$ are each (independently) selected from the group consisting of $C_1$ to $C_{10}$ alkyloxy and aryloxy; $R_5$ and $R_6$ are each (independently) selected from the group consisting of $C_1$ to $C_6$ alkyl, aryl, cycloaliphatics, and are preferably methyl; k and m are numbers from 3 to 30, preferably between 15 and 23; and l (lower case L) is a number from 3 to 10, preferably between 4 and 8.

The alkyls may be linear or branched, saturated or unsaturated, halogenated or non-halogenated. The aryls may be substituted or non-substituted, including halogenated and non-halogenated aryls. The aryls may include alkylaryls, the alkylaryls are linear or branched, saturated or unsaturated, halogenated or non-halogenated.

The silicone phase change material described above may be formed by reacting at least one hydroxyl terminated silicone and at least one alkyl silane.

In a preferred embodiment, the base of the coating comprises a hydrophobic resin selected from the following group: silicones, silicone-epoxy, silicone-polyester, silicone-polyurethane, silicone-alkyd and non-silicone versions of the same. The resin components may be, without limitation, fluorinated or non-fluorinated. Furthermore, any other hydrophobic base may be used, for example, and without limitation, bases that comprise urethane, acrylate, silicate, styrene, olefin, and alkyd may be used. Although bases that comprise hydrophobic resins are preferred, others may also be used. Furthermore, and without limitation, any of the resins may be solvent-borne, water-borne, or solvent-free.

To form a coating according to the present invention, one or more phase change materials are mixed with a base. The preferred phase change material comprises a silicone based material as discussed above, and the preferred base comprises a hydrophobic resin. The amount of phase change material to be mixed with the base depends upon the needs of the particular application. With the preferred silicon phase change material and a hydrophobic resin base, a preferred range for the phase change material is between 5% and 40% of the total coating, by weight. However, this range is illustrative only, and any other range may be used without departing from the present invention. Furthermore, other additives may also be included in the coating formulation, for example, and without limitation, inert additives to improve film formation, gloss retention, UV-stability, and long-term durability. One particular coating formulation comprises a silicone-epoxy resin, a silicone phase change material in the range of 5% to 20% of the total coating by weight, UV-stabilizers in the range of 0.5% to 1% of the total coating by weight, and matting additives in the range of 5% to 10% of the total coating by weight.

The anti-icing characteristics of the coatings described herein arise from the phase change materials. In particular, the phase change materials exist in a passive or dormant state under most environmental conditions, but upon the imposition of ice-forming conditions, they undergo volume changes, thereby mechanically inhibiting the adhesion or formation of ice. There are three steps that lead to the cycle for this mechanical rejection of ice: 1) Micro-phase regions near the coating surface undergo solid-solid phase changes over a narrow temperature range, slightly below where ice formation occurs. Cooling below 0° C. by air flow results in local contraction of the base and simultaneous expansion of the phase change material such that the composite bulk film, on the average, contracts relatively little if at all. 2) Super-cooled water coats the coating surface and freezes. As ice forms on the surface, some of the latent heat of freezing of ice passes to the phase change material near the surface. 3) This heat is absorbed by the phase change material and causes solid-solid phase changes.

This mechanism is shown schematically in FIG. 1. In particular, as cooling occurs, surface regions of the coating expand and adjacent regions contract (FIG. 1(b)). Random mixing of the phase change material into the base of the coating assures this process. The ice-coating interface experiences large local shear stress of alternating sign (FIG. 1(c)). This causes local failure of the ice-coating bonds (FIG. 1(c)-(d)). The coating is now cooled by cold air and the cycle repeats (FIG. 1(d)-(a)). The actual lateral local displacements of the surface are on the order of one tenth the diameter of the particles. These displacements produce a local linear strain parallel to the coating surface of about 0.1, more than enough to locally break the ice-surface bond.

The hydrophobic nature of the coatings described herein has been confirmed through contact angle tests, wherein it has been observed that the contact angle of water droplets are higher for these icephobic coatings than for control coating without phase change materials. Furthermore, it has been observed that coatings according to the present invention inhibit ice formation and ice adhesion.

The particular embodiments and descriptions provided herein are illustrative examples only, and features and advantages of each example may be interchanged with, or added to the features and advantages in the other embodiments and examples herein. Moreover, as examples, they are meant to be without limitation as to other possible embodiments, are not meant to limit the scope of the present invention to any particular described detail, and the scope of the invention is meant to be broader than any example.

And, in general, although the present invention has been described in detail, it should be understood that various changes, alterations, substitutions, additions and modifications can be made without departing from the intended scope of the invention, as defined in the following claims.

What is claimed is:

1. A coating composition, comprising:
a hydrophobic resin; and
a phase change material having the formula:

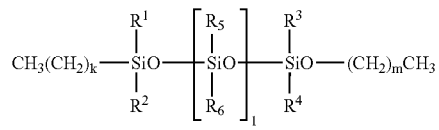

wherein $R_1$, $R_2$, $R_3$ and $R_4$ are each selected from the group consisting of alkyloxy and aryloxy, $R_5$ and $R_6$ are each selected from the group consisting of alkyl, aryl, and cycloaliphatics, and k and m are numbers from 3 to 30 and l is a number from 3 to 10.

2. The coating composition of claim 1, wherein $R_1$ and $R_2$ are each selected from the group consisting of $C_1$ to $C_6$ alkyloxy and aryloxy.

3. The coating composition of claim 1, wherein $R_3$ and $R_4$ are each selected from the group consisting of $C_1$ to $C_{10}$ alkyloxy and aryloxy.

4. The coating composition of claim 1, wherein $R_5$ and $R_6$ are each selected from the group consisting of $C_1$ to $C_6$ alkyl, aryl, and cycloaliphatics.

5. The coating composition of claim 1, wherein k and m are numbers between 15 and 23.

6. The coating composition of claim 1, wherein l is a number between 4 and 8.

7. The coating composition of claim 1, wherein the hydrophobic resin is selected from the group consisting of silicone based epoxy, urethane, acrylate, silicate, styrene, olefin and alkyd.

8. The coating composition of claim 1, wherein the hydrophobic resin is solvent-borne.

9. The coating composition of claim 1, wherein the hydrophobic resin is water-borne.

10. The coating composition of claim 1, wherein the hydrophobic resin is solvent-free.

* * * * *